US011226997B2

(12) United States Patent
Pinel et al.

(10) Patent No.: US 11,226,997 B2
(45) Date of Patent: Jan. 18, 2022

(54) GENERATING A CHATBOT FROM AN FAQ

(71) Applicant: International Business Machines Corporation, Armonk, NY (US)

(72) Inventors: Florian Pinel, New York, NY (US); Donna K. Byron, Petersham, MA (US); Carmine Dimascio, West Roxbury, MA (US); Benjamin L. Johnson, Baltimore City, MD (US)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 15/832,192

(22) Filed: Dec. 5, 2017

(65) Prior Publication Data

US 2019/0171758 A1    Jun. 6, 2019

(51) Int. Cl.
```
G06F 16/332    (2019.01)
H04L 12/58     (2006.01)
G06N 5/02      (2006.01)
G06F 16/22     (2019.01)
G06N 20/00     (2019.01)
```
(52) U.S. Cl.
CPC ...... *G06F 16/3329* (2019.01); *G06F 16/2246* (2019.01); *G06N 5/02* (2013.01); *G06N 20/00* (2019.01); *H04L 51/02* (2013.01)

(58) Field of Classification Search
CPC .. G06F 16/3329; G06F 16/2246; G06F 16/00; G06N 20/00; H04L 51/02
See application file for complete search history.

(56) References Cited

U.S. PATENT DOCUMENTS

| 10,331,402 | B1* | 6/2019 | Spector | G06F 3/167 |
| 2002/0133347 | A1 | 9/2002 | Schoneburg et al. | |
| 2006/0224383 | A1* | 10/2006 | Lee | G10L 15/1815 |
| | | | | 704/252 |
| 2009/0292716 | A1* | 11/2009 | Oliver | G06F 16/367 |
| 2011/0258230 | A1* | 10/2011 | Jung | G06N 5/02 |
| | | | | 707/780 |
| 2014/0164296 | A1 | 6/2014 | Duan | |

(Continued)

FOREIGN PATENT DOCUMENTS

WO    WO 2018/170876    *  9/2018  ............. G06F 17/30

OTHER PUBLICATIONS

Shawar, et al., "Chatbots: Are They Really Useful?", LDV Forum, 2007, 21 pages.

(Continued)

*Primary Examiner* — Jennifer N Welch
*Assistant Examiner* — Qi Wan
(74) *Attorney, Agent, or Firm* — Gavin Giraud

(57) ABSTRACT

A chatbot answer database can be generated from a question and answer document. A question/answer processor can receive a document that includes questions and answers. A set of entities can be determined from the answers in the document. A set of triplets can be constructed from the answers, and stored in a chatbot database. For each answer, the question/answer processor can determine text for slots of the triplet based on the entities extracted from the answer. The triplet can be stored as a tree structure in a database of tree structures associated with the document. A chatbot can receive questions, and provide answers based on the database of tree structures associated with the document.

17 Claims, 5 Drawing Sheets

(56) References Cited

U.S. PATENT DOCUMENTS

| | | | |
|---|---|---|---|
| 2014/0181000 A1* | 6/2014 | Syed | G06N 5/04 |
| | | | 706/56 |
| 2015/0324349 A1* | 11/2015 | Weiss | G06F 40/279 |
| | | | 704/9 |
| 2015/0339577 A1* | 11/2015 | Waltinger | G06N 5/04 |
| | | | 706/12 |
| 2015/0378984 A1* | 12/2015 | Ateya | G06F 16/36 |
| | | | 707/769 |
| 2016/0171062 A1* | 6/2016 | Bute | H04L 67/36 |
| | | | 707/722 |
| 2016/0180242 A1 | 6/2016 | Byron et al. | |
| 2017/0099242 A1* | 4/2017 | Gupta | H04L 51/10 |
| 2017/0169717 A1* | 6/2017 | Allen | G09B 7/08 |
| 2017/0192976 A1 | 7/2017 | Bhatia et al. | |
| 2017/0228372 A1* | 8/2017 | Moreno | G06F 16/3329 |
| 2017/0255694 A1 | 9/2017 | Byron et al. | |
| 2017/0351677 A1* | 12/2017 | Chaubal | G06F 16/248 |
| 2018/0131645 A1* | 5/2018 | Magliozzi | G06F 40/30 |
| 2019/0057143 A1* | 2/2019 | Porter | G06Q 10/10 |

OTHER PUBLICATIONS

Shawar, et al., "FAQchat as an Information Retrieval System", Human Language Technologies as a Challenge for Computer Science and Linguistics: Proceedings of the 2nd Language and Technology Conference, Apr. 2005, 6 pages.

* cited by examiner

GENERATING A CHATBOT FROM AN FAQ

BACKGROUND

Embodiments of the inventive subject matter generally relate to the field of computing systems, and, more particularly, to generating a chatbot from a frequently asked questions (FAQ) document.

A chatbot is a software program that conducts a conversation with a user. For example, a web site may provide a chatbot that can provide automated customer support by responding to customer inquiries about a service or product offered on the web site. Chatbots are typically designed to simulate how a real person would respond to queries or other input provided by a user.

It can be complicated and time consuming to program a chatbot to provide responses. For example, a product may have an associated corpus of documentation. It can be complicated and time consuming to train or otherwise program a chatbot to use the information in the corpus of documentation.

SUMMARY

Systems, methods and machine readable storage media generate a chatbot from a question and answer document. A question/answer processor can receive a document that includes questions and answers. A set of entities can be determined from the answers in the document. A set of triplets can be constructed from the answers, and stored in a chatbot database. For each answer, the question/answer processor can determine text for slots of the triplet based on the entities extracted from the answer. The triplet can be stored as a tree structure in a database of tree structures associated with the document. A chatbot can receive questions, and provide answers based on the database of tree structures associated with the document.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although examples refer to a chatbot, any automated interactive response system could be used instead of, or in addition to a chatbot. In other instances, well-known instruction instances, protocols, structures and techniques have not been shown in detail in order not to obfuscate the description.

Embodiments of the invention process FAQ resources into a tree of base relation triplets that can be used by a chatbot to answer questions about focus entities present in the FAQs. One aspect of some embodiments is that the creation of data for use by a chatbot can be fast and require only minimal, if any, training. Conventional systems typically utilize an entire document corpus instead of an FAQ, and produce a concept graph that can be overly complex and difficult to use to generate conversational flows. Further, an aspect of some embodiments is that unforeseen user inputs can be mapped to the correct answer content without needing example question phrasings as training. As a result, some embodiments can create a database for use by a chatbot faster and more efficiently than previous systems.

Figure 1:
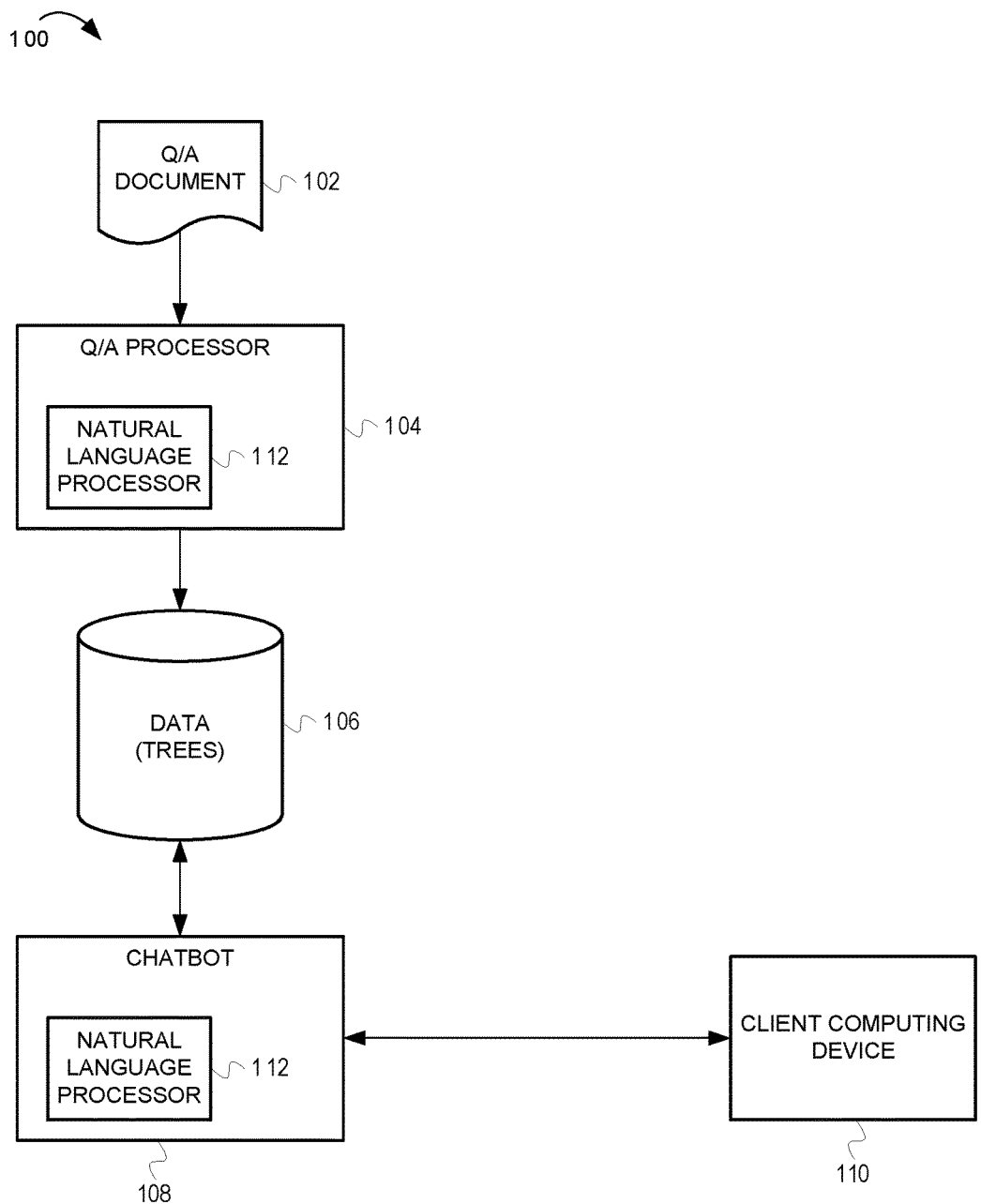
FIG. 1 is a block diagram illustrating components of a system for generating a chatbot from an FAQ.

FIG. 1 is a block diagram illustrating components of a system 100 for generating a chatbot from an FAQ. In some embodiments, system 100 can include a question/answer document 102, a question/answer processor 104, a chatbot 108, and a client computing device 110.

Question/answer document 102 can be a document that includes a set of questions and answers associated with the questions. In some embodiments, question/answer document 102 comprises what is referred to as a "frequently asked questions" (FAQ) document. An FAQ is typically a list of questions and answers associated with a particular topic such as a service or product.

Question/answer processor 104, receives a question/answer document 102 and processes the answers in the document as described below to produce one or more trees of predicates that can be stored in a database 106. In some embodiments, the predicates are two-place predicates, also referred to as a triplet. A two-place predicate comprises a predicate with two entities as arguments. For example, a predicate can be a verb, and the subject and object can be the arguments of the predicate. Those of skill in the art having the benefit of the disclosure will appreciate that the systems and methods described herein can be applied to one-place or three-place predicates to produce pairs or quadruplets instead of triplets. The embodiments are not limited to any particular number of predicate arguments.

Question/answer processor 104 can include a natural language processor 112. Natural language processor 112 can perform entity identification (also referred to as entity extraction) on the answers in question/answer document 102 to identify entities in the answers. The entities can then be used to produce the triplets containing the entities.

Chatbot 108 is a software program that uses the triplets in database 106 to provide answers to client computing device 110. Chatbot 108 can also be referred to as a virtual assistant, virtual agent, interactive agent, bot, or other such terms. Chatbot 108 can receive spoken or textual input and attempt to provide a response based on the input. In some embodiments, chatbot 108 can include a natural language processor 112 to process the spoken or textual input. In some embodiments, chatbot 108 can be a standalone program. For example, chatbot 108 can run on an endpoint on a server or in a cloud based system and can communicate with a presentation layer that provides a user interface for the chatbot on a client computing device 110. In alternative embodiments, chatbot 108 can be an applet or plug-in provided via a web site.

Client computing device 110 interacts with chatbot 108 to provide spoken or textual input, and receives responses from chatbot 108. Client computing device can be any type of device having at least one processor and a memory. Nonlimiting examples of such devices include desktop computers, laptop computers, notebook computers, tablet computers, smart phones, set top boxes, video game consoles, Internet of Things (IoT) devices etc. Additionally, a client computing device 110 can be a device coupled to a touch-screen in a public space such as a kiosk, billboard, cab etc. The embodiments are not limited to any particular type of computing device.

Further details on the operation of the above-described system 100 are provided below with respect to FIGS. 2-4.

Figure 2:
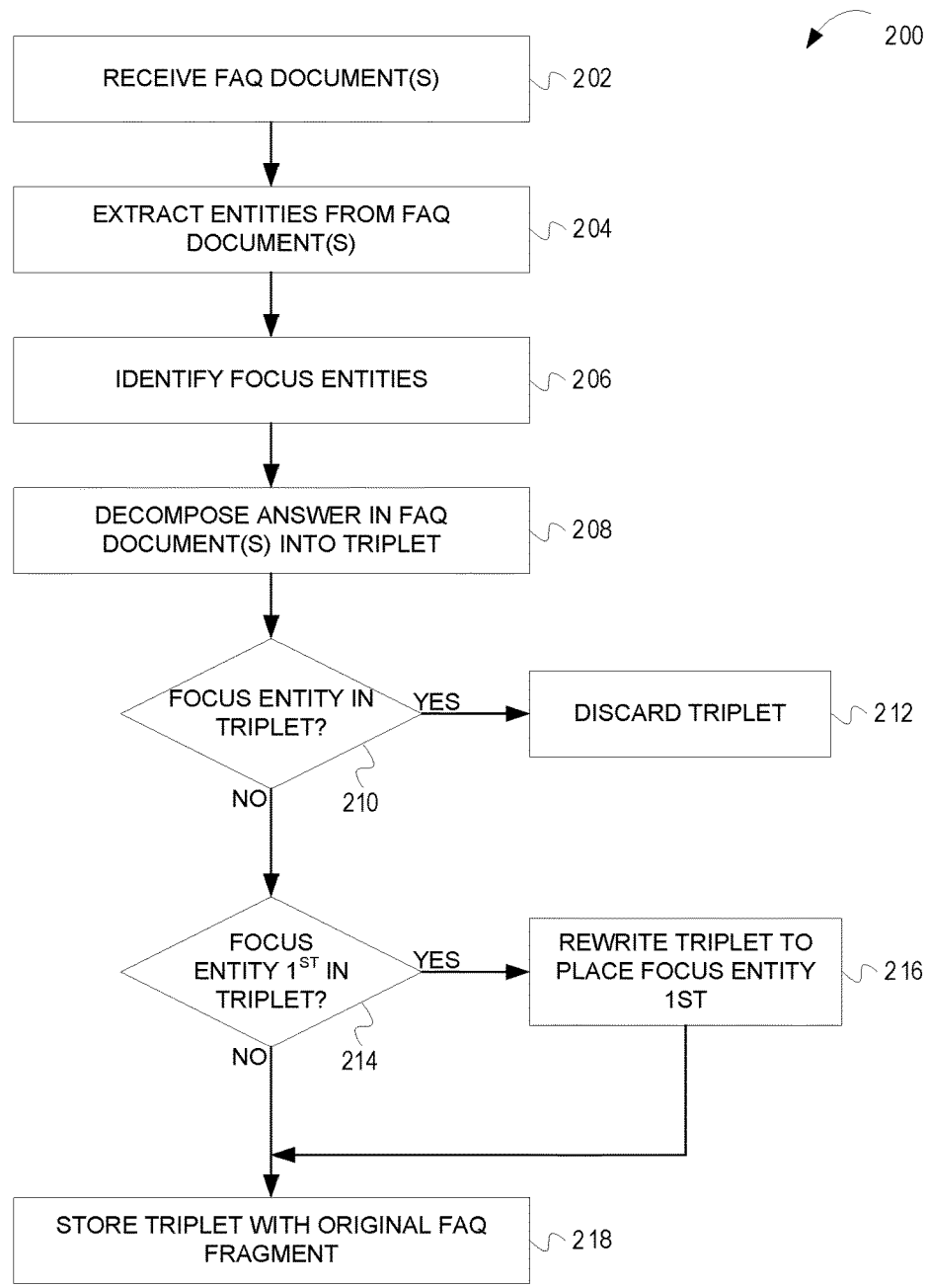
FIG. 2 is a flow chart illustrating operations of a method for processing an FAQ to generate data for use by a chatbot.

FIG. 2 is a flow chart 200 illustrating operations of a method for processing an FAQ to generate data for use by a chatbot 108.

At block 202, a question/answer processor 104 receives a question/answer document 102. In some embodiments, question/answer processor 104 receives an FAQ file associated with a product, service, or other particular topic.

At block 204, the question/answer processor 104 extracts entities from answers in the question/answer document 102. The extracted entities can be analyzed to determine entities of interest, and priorities for entities. Various mechanisms can be used to determine entities of interest. Out-of-vocabulary terms may be considered entities of interest. For example, a product name in the FAQ will normally be an out-of-vocabulary and thus can be identified as an entity of interest. Usage of a term in a sentence can be a basis for identifying an entity of interest. For example, term can be identified as an entity of interest based on its use in a sentence as the subject of the sentence, capitalization, etc. Other mechanisms include identifying entities of interest based on their appearance in page and section headings. Further, an entity of interest can be identified based on a count of how frequently a term is used on a page or in a document. In some embodiments, a trained algorithm that can combine some or all of the above-described features can be used to identify entities of interest.

Priorities of entities can be determined in various ways. For example, entities that are distinctive can be prioritized. Distinctive entities (i.e., entities of interest) may appear in the FAQ document at a higher than expected frequency when compared to an open-domain language model built from other documents like the web or Wikipedia. Statistical models can be built to characterize 'normal' expected frequency of words in an open-domain language with the frequency that words are found in the FAQ documents being analyzed. Additionally, an argument's appearance in certain positions of a sentence, such as the subject and direct object are focused syntactically and can therefore be prioritized, compared to oblique entries such as pre-nominal modifiers or objects of prepositions.

As an example, assume that the question/answer document 102 is associated with a product call "FluZap" that is a cold and flu medicine. Higher importance entities of interest could include "cold," "flu," "FluZap," "symptoms," "fever," "cough" etc. because such concepts typically wouldn't appear very frequently in an open-domain language model. Lower priority entities of interest could include "children," "adult" etc.

At block 206, focus entities can be identified. In some embodiments, focus entities can be manually identified and included in a list of focus entities. In alternative embodiments, focus entities can be identified based, at least in part, on the position of the entities within an answer or answer fragment. For example, a focus entity is more likely to be used as a subject of an answer or answer fragment.

At block 208, the answer or answer fragment is decomposed (i.e., parsed) into one or more triplets. For example, an answer or answer fragment can be decomposed into a subject, verb, and object. In some embodiments, the one or more sentences in the answer are decomposed into a logical form. Concept triplets can be flattened by pulling related concepts closer to each other and normalizing over logical connectors. Lexical input can be replaced by disambiguated word senses. For instance, words in an answer can be mapped to concepts from a controlled inventory so that each one is distinct based on context. As an example, the word 'refresh' might map to distinct concepts like "rest" if applied to a person versus "update display" if applied to a computer user interface.

As an example of the above, consider the question and answer pair:

Q: What is the flu?
A: The influenza virus, commonly called the flu, is a contagious respiratory infection with symptoms that include fever, headache, extreme tiredness, dry cough, sore throat. runny or stuffy nose, and muscle aches.

The example above can be decomposed into the following triplets:

'influenza virus—is called—flu'
'flu—is—contagious'
'flu—is—respiratory infection'
'flu.symptoms—include—fever'
'flu.symptoms—include—headache' etc. . . .

In the flu example above, rather than maintaining the whole list of symptoms as one term, a list of flattened triplets is obtained with each symptom listed individually. Similarly, "contagious respiratory infection" is flattened into "flu is contagious" and "flu is respiratory infection." Additionally, the last two triplets include a first element comprising "flu.symptoms." The use of the period between "flu" and "symptoms" indicates an attribute of a concept. This can be useful in order to avoid the need for three or four place predicates. Those of skill in the art will appreciate that other mechanisms can be used instead of a period to indicate attributes of a concept.

At block 210, a check is made to determine if the triplet includes a focus entity. If the triplet does not include a focus entity, the method proceeds to block 212, where the triplet can be discarded.

If the check at block 210 indicates that the triplet does include a focus entity, then flow proceeds to block 214.

At block 214, a check is made to determine if the focus entity is the first entity of the triplet. If the focus entity is not the first entity of the triplet, then flow proceeds to block 216, where the entity is rewritten such that the focus entity is the first entity of the triplet. Continuing with the flu example, consider the following example question and answer pair:

Q: Can children take FluZap?
A: If your children are under 12, they cannot take FluZap.

The question/answer processor 104 may decompose the above answer into the triplet (1) children (2) cannot take (3) FluZap. Because "children" is not a focus entity, the operation at block 216 can rewrite the triplet as (1) FluZap (2) cannot be taken by (3) children.

At block 218, the triplet can be stored in a database. In some embodiments, triplets are stored in tree structures, where the top level nodes of the trees are focus entities. In some embodiments, the triplets can be associated with the answer or answer fragment that was the source of the triplet.

Figure 3:
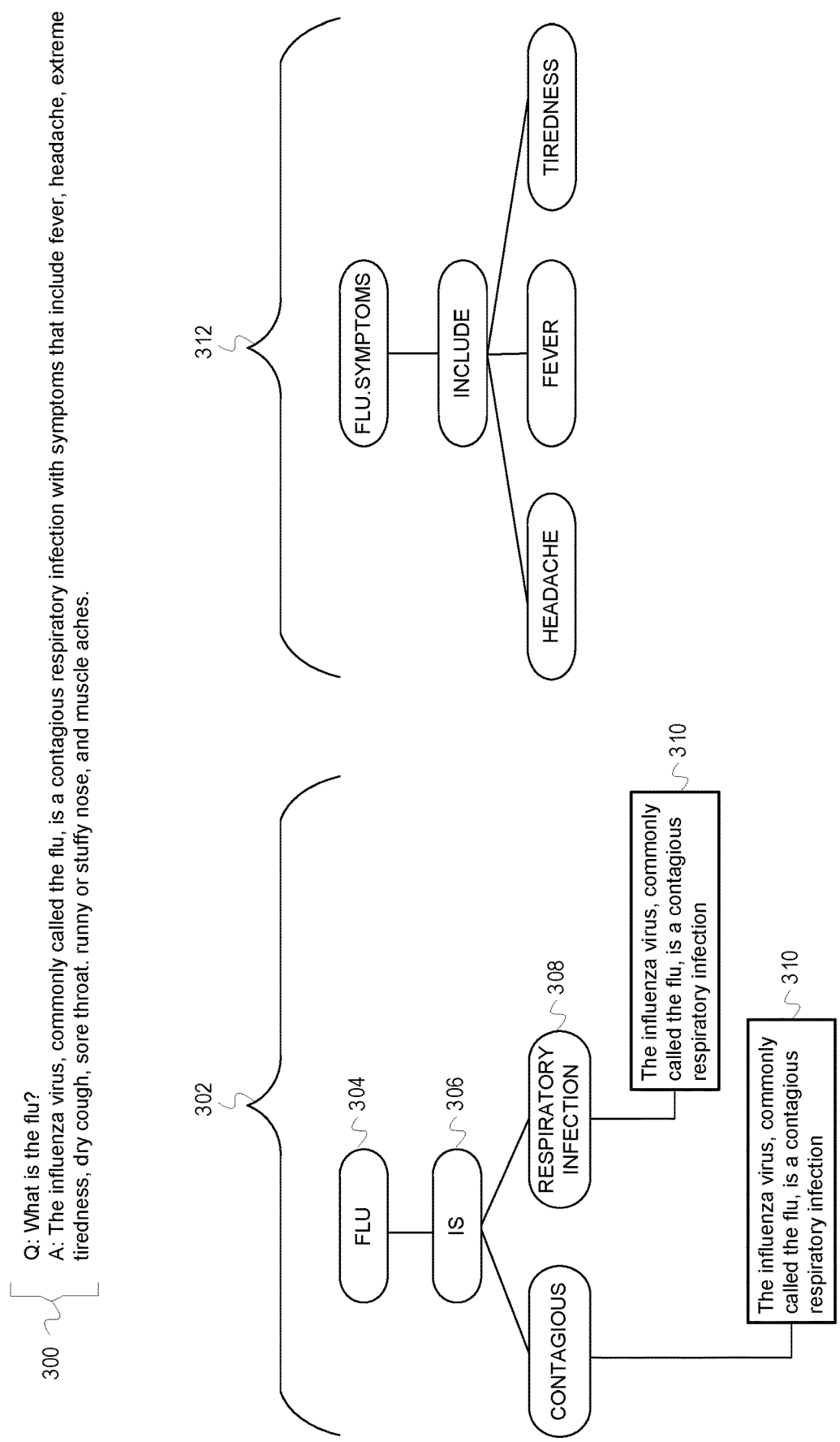
FIG. 3 is a diagram illustrating a portion of an example graph of triplets for a chatbot generated from an FAQ.

FIG. 3 is a diagram illustrating an example graph of triplets for a chatbot generated from an FAQ. The example graph is based on the question/answer pair 300 discussed above. The answer has been decomposed into multiple triplets, where the triplets are represented by a tree 302 and a tree 312. The top level node 304 of tree 302 has a focus entity "flu." The triplets represented in tree 302 are "flu is contagious" and "flu is respiratory infection." The top level node of tree 312 is "flu.symptoms." The triplets represented in tree 312 are "flu.symptoms include headache," "flu.symptoms include fever" and "flu.symptoms include tiredness." In some embodiments, a tree can include associated answer text 310 that can be the answer or answer fragment associated with the triplet.

Figure 4:
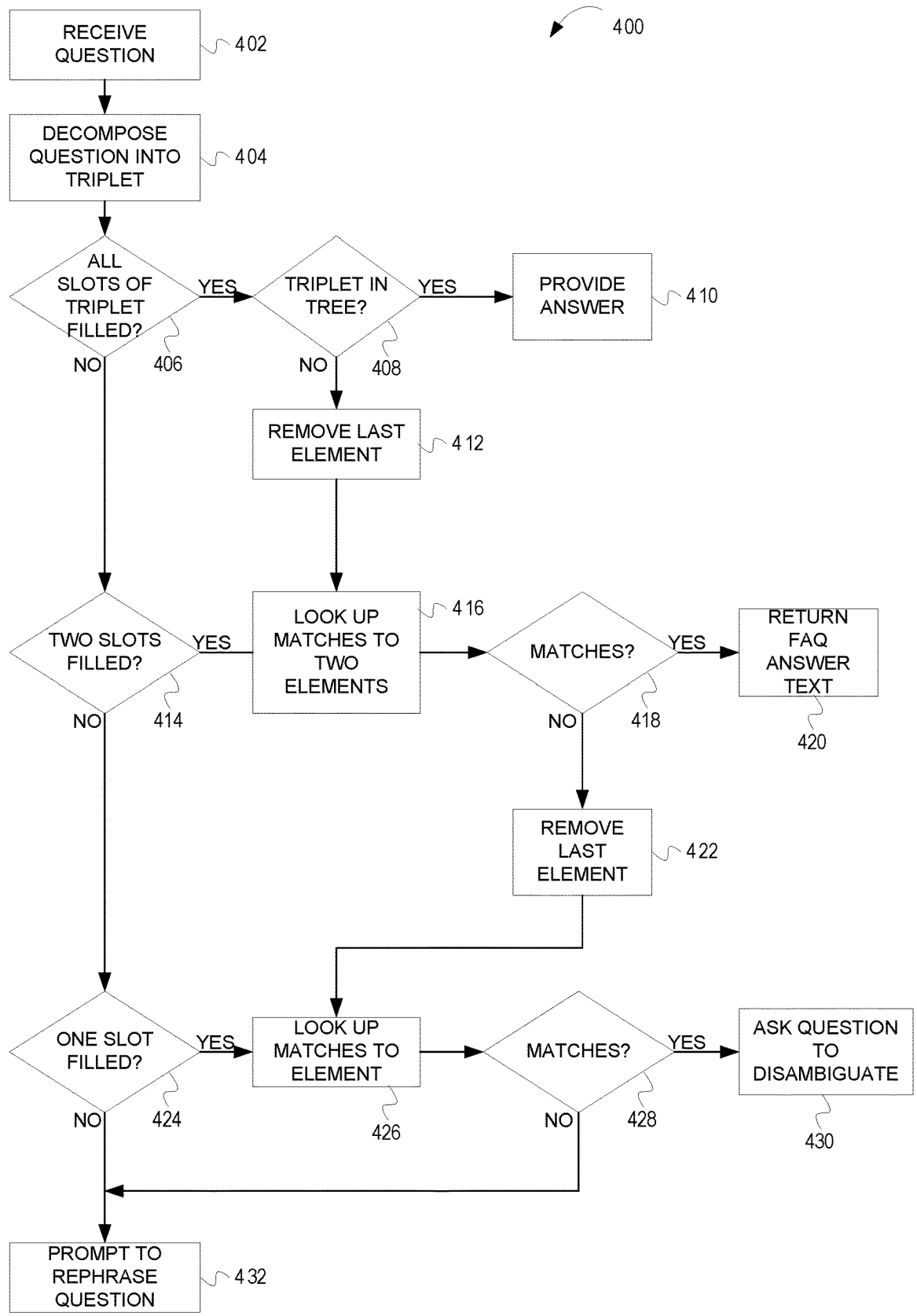
FIG. 4 is a flow chart illustrating operations of a method for responding to questions issued to a chatbot generated from an FAQ.

FIG. 4 is a flow chart 400 illustrating operations of a method for responding to questions.

At block 402, the chatbot 108 receives input from a client computing device 110. The input can be in the form of a question, however this is not required. Further, the input can be audio input, for example a spoken question, or textual input.

At block 404, the chatbot 108 decomposes the input into a triplet. As noted above, the chatbot 108 can use natural language processing techniques to extract entities from the input. The chatbot can then attempt to fill the slots of a triplet from the input. Additionally, the chatbot 108 can determine if the input includes a focus entity. If so, the focus entity is used to fill the first slot of the triplet. In some embodiments, synonyms can be mapped to entities used in the trees. Not every question will fill all three slots. For example, the question "Is influenza contagious?" can fill three slots. The entity "influenza" can be mapped to the synonym "flu." The triplet associated with question has all three slots filled: (1) flu (2) is (3) contagious. As a further example, the question "What is the flu?" can result in two slots of a triplet being filled: (1) flu (2) is (3) [unfilled]. The question "Flu symptoms?" can result in one slot being filled (1) flu (2) [unfilled] (3) [unfilled].

At block 406, a check is made to determine if all three slots of the triplet have been filled. If all three slots have been filled, flow proceeds to block 408. If all three slots have not been filled, flow proceeds to block 414.

At block 408, the chatbot 108 checks to determine if the triplet formed by the input provided to the chatbot is in a tree in database 106. If the triplet is in the database, then flow proceeds to block 410.

At block 410, the chatbot 108 provides an answer to the question issued by the client device. In some embodiments, a "yes/no" answer can be provided. For example, a "yes" answer can be provided when a question provides all three slots of a triplet, and an answer matches the three values. Alternatively, a "no" answer can be provided when a question provides all three slots of a triplet, but some or all of the values of the question triple do not match any answer triplet or is in conflict with an answer triplet. For example, the question "is hair falling out a symptom of the flu" may result in a question triple of (1) flu.symptom (2) is (3) hair falling out. Because the triple does not match any answer triplet, a "no" answer can be provided by the chatbot.

After the operations of block 410 have been performed, the method then ends.

If the check at block 408 determines that the triplet is not in the tree, then flow proceeds to block 412.

At block 412, the last element of the triplet is removed. Flow then proceeds to block 416.

If the check at block 406 determined that not all three slots of the triplet were filled, then flow proceeds to block 414. At block 414, a check is made to determine if two slots of the triplet have been filled. If two blocks are filled, flow proceeds to block 416. If two slots are not filled, then flow proceeds to block 424.

Block 416 can be reached when either two slots of a question triplet are filled by parsing the question, or if a slot is removed when a triplet does not match a triplet in any of the trees in database 106. At block 416, the chatbot looks for matches in the trees of database 106 based on the two slots of the triplet that are filled.

At block 418, a check is made to determine if a match was found. If a match was found, then flow proceeds to block 420. If a match is not found, then flow proceeds to block 422. At block 420, a match is found based on the two filled slots of the triplet, and the answer or answer fragment associated with the triplet or triplets that match the first two slots can be returned as the answer to the question. The method then ends.

If the check at block 418 determines that a match to the two slots of the triplet does not exist in the trees of database 106, then at block 422, the last element is removed, leaving one slot filled in the triplet. Flow then proceeds to block 426.

If the check at block 414 determines that two slots are not filled, then flow proceeds to block 424 to determine if one slot is filled. If one slot is filled, then flow proceeds to block 426. If one slot is not filled, then flow proceeds to block 432.

Block 426 can be reached either by one slot being filled based on the question, or if a slot was removed from a triplet containing two filled slots. At block 426, the chatbot 108 searches for matches to the one slot in the trees of database 106.

At block 428, a check is made to determine if matches were found. Flow proceeds to block 430 if a match is found. If a match is not found, then flow proceeds to block 432.

At block 430, the user can be prompted with one or more questions to attempt to disambiguate the original question submitted by the user. For example, the chatbot may present all of the matching triplets, and ask the user to select one of the matching triplets. An answer can then be provided based on the selected triplet.

Block 432 is reached when there are no matches between the triplet formed from input provided by a user via a client computing device and a triplet in the trees of database 106. At block 432, the user can be prompted to rephrase their question, which can then be analyzed in the same manner as discussed above. The method then ends.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
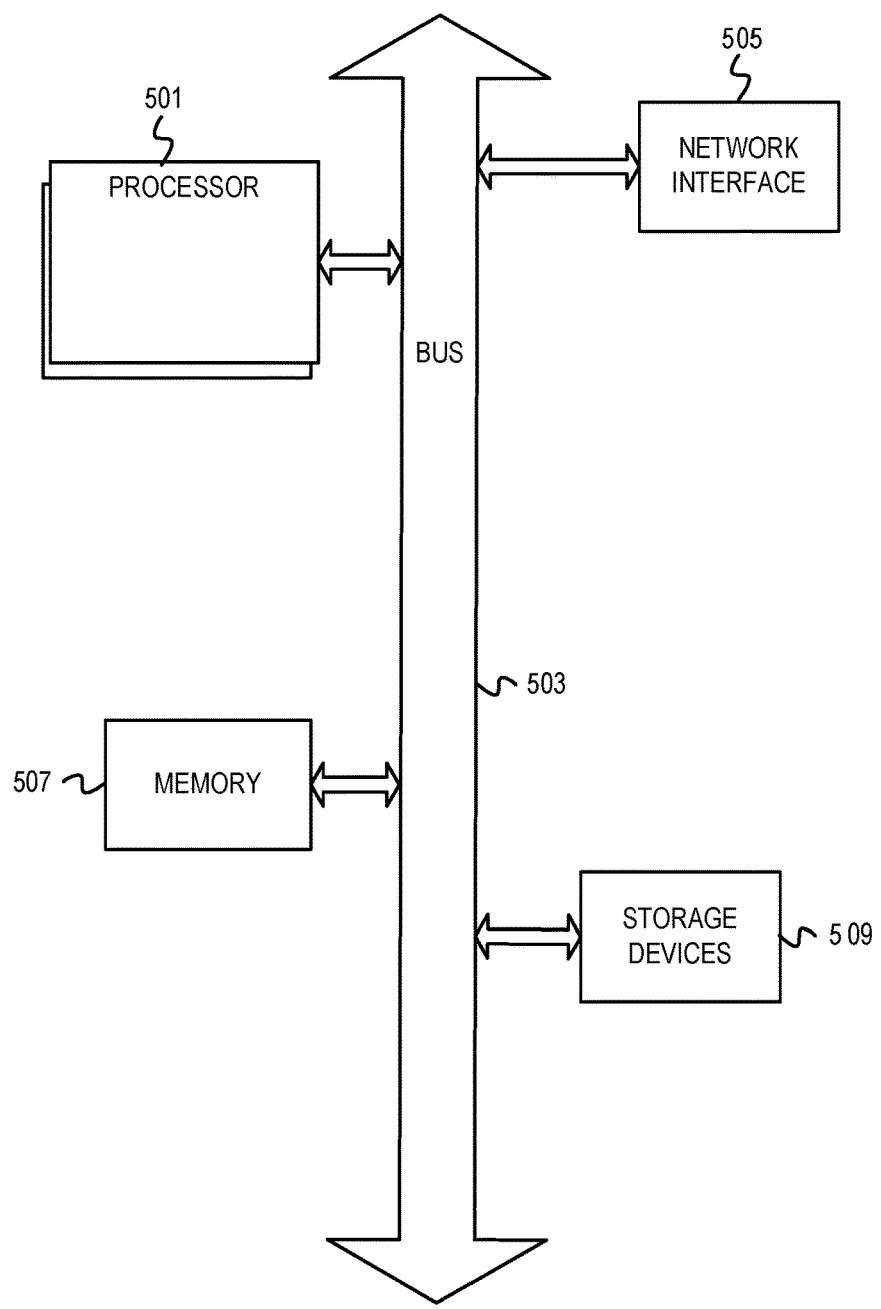
FIG. 5 depicts an example computer system in which aspects of the disclosure can be implemented.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The system memory 507 embodies functionality to implement embodiments described above. The system memory 507 may include instructions and/or data used to implement one or more functionalities that facilitate generating data for a chatbot and responding to questions issued to a chatbot. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for generating data for a chatbot and using the data to response to user submitted questions as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for generating a chatbot from a question and answer document, the method comprising:
   receiving, by one or more processors, at least one document comprising a plurality of questions and a plurality of answers to the plurality of questions;
   determining a plurality of entities in the plurality of answers to the plurality of questions;
   for an answer of the plurality of answers:
      determining text slots of a triplet based, at least in part, on one or more entities extracted from the answer,
      determining that the triplet comprises a focus entity of the plurality of entities,
      determining that a first slot of the text slots does not comprise a focus entity, and
      in response to determining that the first slot does not comprise a focus entity, rewriting the triplet so that the first slot of the text slots of the triplet is the focus entity;
      storing the rewritten triplet as a tree structure in a database of tree structures associated with the at least one document; and
   providing, by the chatbot, an answer response based on the rewritten triplet.

2. The method of claim 1, further comprising:
   determining that the triplet does not include a focus entity; and
   in response to determining that the triplet does not contain a focus entity, discarding the triplet.

3. The method of claim 1, further comprising:
   disambiguating an entity to produce text for a slot of the triplet.

4. The method of claim 1, further comprising:
   flattening the answer to create a plurality of concepts, wherein a first concept is used for the triplet and a second concept is used for at least one additional triplet.

5. The method of claim 1, wherein storing the triplet as the tree structure in the database of tree structures includes storing the focus entity as a top level node of the tree structure.

6. The method of claim 1, wherein providing the answer comprises:
   receiving a question;
   creating a question triplet from the question;
   determining if an answer triplet in the database of tree structures is a match to the question triplet; and
   providing the answer response to the question in response to determining that the answer triplet matches the question triplet.

7. The method of claim 6, further comprising:
   determining that two slots of the question triplet match two slots of the answer triplet; and
   providing answer text associated with the answer triplet in response determining that the two slots of the question triplet match the two slots of the answer triplet.

8. The method of claim 6, further comprising:
   determining that one slot of the question triplet matches one slot a plurality of answer triplets;
   presenting the plurality of answer triplets to a user;
   receiving an indication of a user selection of the plurality of answer triplets; and
   providing answer text associated with the selected answer triplet.

9. A computer readable non-transitory hardware storage medium including computer executable instructions that, when executed by one or more processors, cause the one or more processors to perform operations for generating a chatbot from a question and answer document, the operations comprising:
   instructions to receive at least one document comprising a plurality of questions and a plurality of answers to the plurality of questions;
   instructions to determine a plurality of entities in the plurality of answers to the plurality of questions;
   for an answer of the plurality of answers:
      instructions to determine text slots of a triplet based, at least in part, on one or more entities extracted from the answer,
      instructions to determine that the triplet comprises a focus entity of the plurality of entities,
      instructions to determine that a first slot of the text slots does not comprise a focus entity, and
      instructions to, in response to determining that the first slot does not comprise a focus entity, rewrite the triplet so that the first slot of the text slots of the triplet is the focus entity;
      instructions to store the rewritten triplet as a tree structure in a database of tree structures associated with the at least one document; and
   instructions to provide an answer response by the chatbot based on the rewritten triplet.

10. The machine readable storage medium of claim 9, wherein the operations further comprise:
    instructions to determine that the triplet does not include a focus entity; and
    instructions to discard the triplet in response to determining that the triplet does not contain a focus entity.

11. The machine readable storage medium of claim 9, wherein the operations further comprise:
    store answer text associated with the answer used to create the triplet in the database; and
    associate the answer text with the triplet in the database.

12. The machine readable storage medium of claim 9, wherein the operations to store the triplet as the tree structure in the database of tree structures includes operations to store the focus entity as a top level node of the tree structure.

13. The machine readable storage medium of claim 9, wherein the operations that provide the answer response comprise:
    instructions to receive a question;
    instructions to create a question triplet from the question;
    instructions to determine if an answer triplet in the database of tree structures is a match to the question triplet; and
    instructions to provide the answer response to the question in response to determining that the answer triplet matches the question triplet.

14. A system for generating a chatbot from a question and answer document, the system comprising:
    one or more processors; and
    a machine readable storage medium including a computer program product having computer executable instructions that, when executed by the one or more processors, perform operations comprising:
       instructions to receive at least one document comprising a plurality of questions and a plurality of answers to the plurality of questions;
       instructions to determine a plurality of entities in the plurality of answers to the plurality of questions;
       for an answer of the plurality of answers:
          instructions to determine text slots of a triplet based, at least in part, on one or more entities extracted from the answer, instructions to determine that the triplet comprises a focus entity of the plurality of entities, instructions to determine that a first slot of the text slots does not comprise a focus entity, and instructions to, in response to determining that the first slot does not comprise a focus entity, rewrite the triplet so that the first slot of the text slots of the triplet is the focus entity;

instructions to store the rewritten triplet as a tree structure in a database of tree structures associated with the at least one document; and instructions to providing an answer response by the chatbot based on the rewritten triplet.

15. The system of claim 14, wherein the operations further comprise:

instructions to determine that the triplet does not include a focus entity of the set of one or more focus entities; and instructions to discard the triplet in response to determining that the triplet does not contain a focus entity.

16. The system of claim 14, wherein the operations to store the triplet as the tree structure in the database of tree structures include operations to store the focus entity as a top level node of the tree structure.

17. The system of claim 14, wherein the operations that provide the answer response comprise:

instructions to receive a question;

instructions to create a question triplet from the question;

instructions to determine if an answer triplet in the database of tree structures is a match to the question triplet; and instructions to provide the answer response to the question in response to determining that the answer triplet matches the question triplet.

\* \* \* \* \*